United States Patent
Guerreiro

(10) Patent No.: US 10,161,438 B2
(45) Date of Patent: Dec. 25, 2018

(54) CONNECTING ROD

(71) Applicant: ThyssenKrupp Metalúrgica Campo Limpo Ltda., Campo Limpo Paulista SP (BR)

(72) Inventor: Sergio Stefano Guerreiro, Sorocaba-SP (BR)

(73) Assignee: THYSSENKRUPP METALURGICA CAMPO LIMPO LTDA., Campo Limpo Paulista (BR)

(*) Notice: Subject to any disclaimer, the term of this patent is extended or adjusted under 35 U.S.C. 154(b) by 0 days.

(21) Appl. No.: 15/511,162

(22) PCT Filed: Sep. 14, 2015

(86) PCT No.: PCT/BR2015/000139
§ 371 (c)(1),
(2) Date: Mar. 14, 2017

(87) PCT Pub. No.: WO2016/041032
PCT Pub. Date: Mar. 24, 2016

(65) Prior Publication Data
US 2017/0276167 A1    Sep. 28, 2017

(30) Foreign Application Priority Data

Sep. 19, 2014 (EP) .................................. 14185495

(51) Int. Cl.
*F16C 23/04* (2006.01)
*F16C 7/02* (2006.01)
(Continued)

(52) U.S. Cl.
CPC ............... *F16C 7/023* (2013.01); *F16C 9/02* (2013.01); *F16C 9/04* (2013.01); *F16C 23/041* (2013.01);
(Continued)

(58) Field of Classification Search
CPC .... F16C 7/023; F16C 9/02; F16C 9/04; F16C 2360/22
See application file for complete search history.

(56) References Cited

U.S. PATENT DOCUMENTS 7,240,584 B1 * 7/2007 Luehrmann ................ F16J 1/16
384/192
8,245,687 B2 * 8/2012 Lapp .......................... F16J 1/14
123/197.3
(Continued)

FOREIGN PATENT DOCUMENTS

FR          800533 A      7/1936
JP      H11 201166 A      7/1999
(Continued)

OTHER PUBLICATIONS

Int'l Search Report for PCT/BR2015/000139 dated Jan. 12, 2016.

*Primary Examiner* — Vicky A Johnson
(74) *Attorney, Agent, or Firm* — ThyssenKrupp North America, Inc.

(57) ABSTRACT

A connecting rod for an internal combustion engine may include a big end passage for receiving a pin journal of a crankshaft, a small end passage for receiving a piston pin, and a beam extending between the big and small end passages. The small end passage may extend along a passage axis and be delimited by opposed edges. The small end passage may include an inner passage surface with a cylindrical surface portion having a first diameter. The small end passage may extend along the passage axis between the opposed edges. The inner passage surface may comprise profiled regions adjacent to the opposed edges and extending at least over a part of a circumference of the opposed edges. The profiled regions may begin from the cylindrical surface portion and increase into a maximum second diameter at the opposed edges. Further, a plurality of dimples may be
(Continued)

positioned along the cylindrical surface portion of the inner passage surface.

14 Claims, 2 Drawing Sheets

(51) Int. Cl.
*F16C 9/04* (2006.01)
*F16C 33/10* (2006.01)
*F16J 7/00* (2006.01)
*F16C 9/02* (2006.01)

(52) U.S. Cl.
CPC ............... *F16C 33/103* (2013.01); *F16J 7/00* (2013.01); *F16C 2240/50* (2013.01); *F16C 2360/22* (2013.01)

(56) References Cited

U.S. PATENT DOCUMENTS

| | | | |
|---|---|---|---|
| 2002/0157534 A1* | 10/2002 | Schneider | F16C 9/04 92/187 |
| 2004/0228554 A1 | 11/2004 | Fujita et al. | |
| 2006/0101939 A1* | 5/2006 | McEwan | F16C 33/14 74/579 R |
| 2009/0145394 A1 | 6/2009 | Nigro et al. | |
| 2011/0162614 A1 | 7/2011 | Lapp et al. | |
| 2014/0242277 A1 | 8/2014 | Kemnitz et al. | |

FOREIGN PATENT DOCUMENTS

| | | |
|---|---|---|
| WO | 00/34696 A1 | 6/2000 |
| WO | 2011/082815 A1 | 7/2011 |

\* cited by examiner

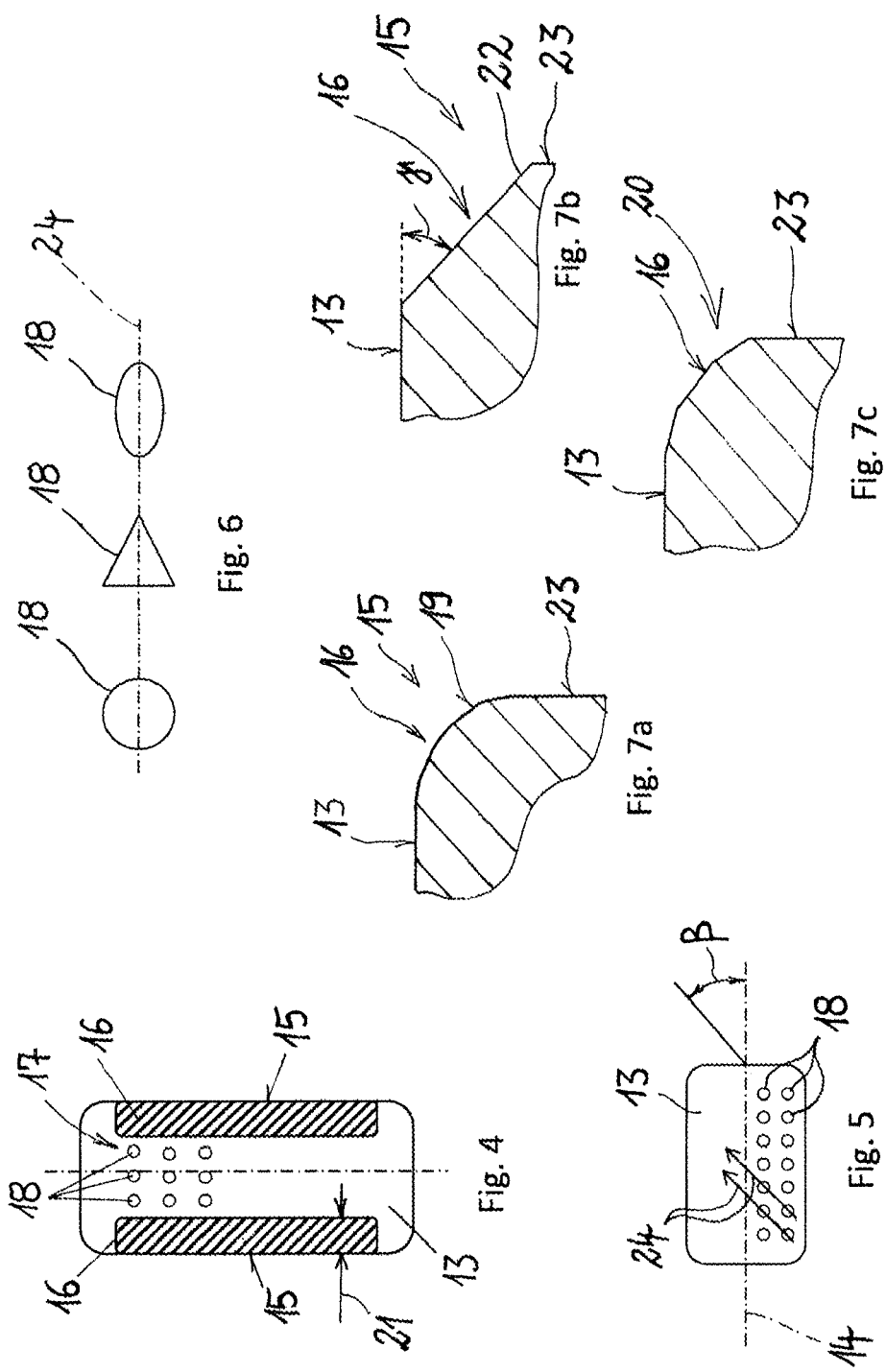

CONNECTING ROD

CROSS REFERENCE TO RELATED APPLICATIONS

This application is a U.S. National Stage Entry of International Patent Application Serial Number PCT/BR2015/000139, filed Sep. 14, 2015, which claims priority to European Patent Application No. 14 185 495.0 filed Sep. 19, 2014, the entire contents of which are incorporated herein by reference.

FIELD

The present disclosure generally concerns connecting rods for internal combustion engines.

BACKGROUND

WO 2011/082815 A1 discloses a connecting rod, and the passage surface of the small end may define a plurality of dimples that extend axially along the bore surface and may further include profiled surfaces adjacent to the opposing edges of the small end passage. The profiled surfaces of the small end passage may be shaped to correspond to a bending shape of the piston pin during operation of the connecting rod. Said profiled surface meets in an axially central portion of said passage opening, each extending therefrom to a respective end of said passage and taper away from said axis moving in a direction from an axially central portion of said passage toward the respective opposing end of said passage opening edge. It is also disclosed a method of making a connecting rod comprising removing material from the passage surface to define a plurality of dimples and profiling opposing ends of said passage. In the above disclosed method, the plurality of dimples is manufactured prior to profiling said opposing ends of said passage opening.

The trumpet shape surface which is performed with a continuously crescent slope beginning from the center, increases an oil flow rate in comparison to a cylindrical surface, jeopardizing the lubrication performance. Moreover, as dimples functions as an oil reservoir, they become less effective at the profiled inner surface of the passage. As a result, the small end passage arrangement implies a process with higher cost and worse productivity.

In operation of the internal combustion engine the piston pin bends in a flexional movement within the small end passage. This deflection movement is induced by the periodic arising gas forces impacting the piston and the movement leads to a flexural bending of the piston pin.

This periodic bending induces an accommodation of the piston pin within the small end passage and the flexional movement begins in the middle of the small end passage and ends in both opposed edges. Due to this flexional movement from the middle to the edges the lubricating oil between the piston pin and the inner passage surface is squeezed out of the lubricating gap inducing a pumping effect or higher axial flow. Accordingly, the probability of contact between the piston and the connecting rod is increased due to lack of oil in the inner passage. Thus, it is desirable to reduce wear and to stabilize the oil film in the lubrication gap between the piston pin and the small end passage.

The dimples depth is defined at a predetermined distance which forms a common plane distanced from the bore opening axis and are produced prior to a profiling process associated. The dimples in the axially central portion of said bore opening are then deeper than dimples closer to opposing edges. Measuring of such dimples is complex and complicates securing that their shape, distribution and, ultimately, volumes are properly manufactured for best component performance.

WO 00/34696 A1 discloses a connecting rod defining a profiled small end passage which is shaped with an angled relief portion adjacent to each opening edge and a piston pin is inserted through the profiled small end passage and into portions of the piston for securing together the piston and the connecting rod. The profiled surface portions are shaped to provide a relief for the piston pin deflection and a piston pin can be inserted into said small end passage for securing together the piston and the connecting rod. The profiled relieves portions are shaped with a plurality of end-to-end frustoconical sections which define a curved surface. But the even, untreated inner passage surface may cause oil starvation providing dry contact between the small end passage and the piston pin.

US 2009/0145394 A1 discloses a connecting rod comprising a small end passage for a piston pin having a wavy profile extending between the opening edges. The wavy profile has at least one concave surface with a valley extending along a circumferential direction of the small end passage. The small end passage has a profile wherein the profile extends between opening edges of the connecting rod. The profile has at least one concave surface transitioning to convex surfaces on laterally opposite sides of the concave surface to provide, at least, a double wave form that facilitates a generally smooth load distribution and uniform flow of lubrication between the piston pin and the small end passage in use. The wavy geometry provided in the small end passage surface may cause an incompatible piston pin deformation, consequently, causing dry contact between the small end passage surface and the piston pin, most probably, in the convex regions of the wavy geometry. The wavy geometry may present another problem, namely the loss of hydrodynamic sustentation in the concave regions, these regions represent an excessive large clearance, as a consequence, the thickness of the oil film may increase, and, as another disadvantage, the oil pressure reduces and the oil load capacity decreases.

SUMMARY

The present disclosure generally relates to a connecting rod for an internal combustion engine comprising a big end passage for receiving a pin journal of a crankshaft; a small end passage for receiving a piston pin, the small end passage extending along a passage axis and delimited by opposed edges; a beam arranged between the big end passage and the small end passage; said small end passage comprising an inner passage surface with a cylindrical surface portion having a first diameter; said small end passage extending along said passage axis between said opposed edges.

The connecting rod is the link between the piston and the crankshaft, whereas the small end is connected to the piston by means of the pin and the big end is connected to the crankshaft pin journal. Its main function is to transmit the power generated by the combustion in the cylinder chamber to the crankshaft, and the piston performs a reciprocating linear movement in the cylinder chamber. During the linear motion of the piston, the small end, which is connected to the piston by means of the pin, moves up and down, and this linear motion is converted into a rotary motion in association with the crankshaft, connected to the big end of the connecting rod, leading to a rotary motion of the big end.

The connecting rod must be rigid and lightweight so as to reduce inertia and vibration effects. Also, the lubrication between movable parts, including the small end passage of the connecting rod and the piston pin, must be adequate and efficient in order to guarantee efficient engine operation parameters and to reduce wear of the related components.

A bushing is generally used to support rotary shafts, and preferably in the small end passage of a connecting rod such a bushing is inserted at the small end in order to accommodate the piston pin. The piston pin bushing was first developed to improve heat transfer and to reduce friction losses, thereby a bushing usually is used as a sacrifice component suffering wear to protect other components. This fact may be seen as an advantage, but the need of the bushing represents extra costs and structural limitations.

Known in prior art, small end bushings have a restricted value of resistance, and some bushings are produced to resist only within limited ranges. Close to the moment when the pistons reaches the upper dead center where the fuel combustion occurs, a high force is generated which is transmitted to the piston and immediately transmitted to the piston pin. Consequently, the force is transmitted to the small end bushing. If said force exceeds a specified value the bushing will fail compromising the engine operation. The bushing is then one of the engines structural bottlenecks and thus the constraints of its function.

The piston pin is responsible for the force transmission from the piston to the connecting rod, and a piston pin is usually a cylindrical steel component with a determined elastic capacity. This component constantly undergoes load variations. As the piston goes up and down, the piston pin bends in response to the forces applied. Otherwise, the small end bore is not able to conform accordingly, hence, in some engine conditions, one may observe dry contact between the piston pin and the small end bore.

Furthermore, one example object of the present disclosure is to eliminate the above mentioned disadvantages. In particular, one example objective is to adapt the small end passage for a piston pin deformation during a high load of force. Yet another example objective of the present disclosure is to improve the lubrication conditions in the small end passage in combination with a piston pin during operation of the internal combustion engine.

This objective is achieved by a connecting rod as taught by claim 1 of the present invention. Preferred embodiments of the invention are defined by the sub claims.

According to the invention said inner passage surface comprises profiled regions adjacent to each of said opposed edges and extending at least over a part of the circumference of said opposed edges, and said profiled regions starting from said cylindrical surface portion and increasing into a maximum second diameter at each of said opposed edges and said inner passage surface comprises a plurality of dimples arranged in said cylindrical surface portion of said inner passage surface.

The design of the small end passage comprising the features according to the invention improves the engine performance extensively, and for the main part the improvement bases on the combination of a special design of the profiled regions with the implementation of a plurality of dimples within a defined region in the centrally arranged cylindrical section. The plurality of dimples are preferably applied neighboring to the profiled regions, in particular the defined region with the plurality of dimples is located in the cylindrical part of the small end passage intermediate of the profiled regions. This combination enables the bushingless performance of a connecting rod with advantageous characteristics meeting the objective of the present invention, and the small end passage is performed preferably in the connecting rod and thus without a bushing.

Due to the limited area of the profiled regions adjacent to the opposed edges of the small end passage, the passage comprises a cylindrical section in between the two profiled regions located at the opposed opening edges, and in this cylindrical section the at least one defined region with the plurality of dimples is arranged. In particular when the profiled regions are not applied in the entire circumference, namely less than 360° in the opposed edges around the passage axis, the profiled regions can be adapted to the elastic deformation of the piston pin, and an adaptation of a crescent part of the full circle is sufficient and in particular beneficial.

When the piston pin is stressed with the periodic forces induced by the gas forces of the internal combustion engine acting on the piston, the deflection of the piston pin leads to a reduced flexural deflection, because the piston pin is accommodated in the cylindrical inner passage. Accordingly, the periodic cyclic bending movement of the piston pin within the small end passage leads to a reduced pumping or pressing out effect of the lubricating oil.

As a result the carrying capacity of the link between the piston and the connecting rod is improved due to the stabilized oil film in the lubrication gap between the piston pin and the small end passage.

In spite of the absence of the dimples, lubrication of the profiled regions is already ensured by the oil splashed from piston cooling spray and of oil from the edge of the small end passage into the trumpet shape or into the multiple-chamfer shape of the profiled regions and thus also into the cylindrical inner passage. The pumping effect rests on an opening and closing of a gap between the profiled region surface and the cyclic bending piston pin with each deflecting movement of the piston pin. When the gap opens, oil is sucked into the gap and when the gap closes, oil is pressed out of the closing gap again.

According to yet another advantage the manufacturing process is simplified when a curvature is not applied over the entire length of the small end passage. The measuring and the tolerance defining of a necessary diameter in the small end passage for an exact receiving the piston pin is very laborious and the definition of the effective diameter must be limited to only the center plane of the bore. When according to the invention the inner passage surface features a cylindrical passage, the defining of a desired diameter is simplified and dimples are better defined on regards of shape and distribution.

Preferably the profiled regions define a trumpet shape or a multiple-chamfer shape. The trumpet shape forms a radius transition from the small end passage into the side wall of the small end head, and, alternatively, when the profiled regions feature a multiple-chamfer shape, the profiled regions form a kind of a polygon-shape.

In a plurality of experimental series it was determined a number of values according to the design of the profiled regions and the design of dimples, leading to particular advantageous results in an engine performance, in particular the friction, the wear and the loading carrying capacity of the connection between the connecting rod and the piston with the piston pin could be optimized.

As an alternative to the trumpet shape and the multiple-chamfer shape the profiled regions can be formed by a single chamfer with an angle between the surface of the chamfer and the passage axis of 1' to 1°, preferred 5' to 25' and most preferred of 7'. In particular, the angle of the single chamfer can vary over the circumferential angle of the profiled regions forming an arc and in particular forming a crescent. The profiled regions can form a crescent shape around the passage axis over the circumferential angle, and in particular the profiled regions are arranged in or next to the section of the small end passage where the shaft transits into the small end. In this region the chamfer can feature a greater angle than neighboring to this position. In particular the ends of the crescent shape can feature a single chamfer with a small angle and in the middle of the crescent the profiled regions can feature a single chamfer with a maximum angle, in particular of 7'. When the crescent is smaller than 360°, the ends can pass over into a non-chamfered edge of the passage, and when approaching the middle point of the crescent, the angle of the single chamfer results in a maximum value. This special design of the profiled regions is also applicable by a trumpet shape or a multiple-chamfer shape.

According to another advantage of the inventive performance of the small end passage, dimples are formed with a dimple diameter of 50 μm to 110 μm and preferred of 74 μm and/or dimples are formed with a depth of 1 μm to 10 μm and preferred 5.5 μm. In particular the plurality of dimples defines a cumulated surface area of 4% to 11% and preferred of 7.5% of the defined region in the passage surface.

According to another preferred embodiment the plurality of dimples in the inner passage surface are limited to a defined region, in particular the defined region is located between the profiled regions. In particular, one or more than one defined regions with a plurality of dimples may be applied in the inner passage surface.

In some examples, the profiled regions do not feature a surface with dimples, and the separation of the profiled regions from a region with a plurality of dimples lead to improvements in manufacturing the small end passage.

The single volume of dimples and the dimple density allows the small end of the connecting rod to support high pressures due to the compression of oil on the dimples, avoiding the dry contact between the surface of the small end passage and the piston pin. The bushing elimination allows the operation of elements applied in the small end surface, as example, dimples may operate directly and continuously at the tribological pair, which is formed between the surface of the passage and the surface of the piston pin. This design of the connecting rod may lead to a reduction of costs on manufacturing and assembly of the connecting rod due to the absence of a bushing, and the plurality of dimples contributes for the oil storage and for reducing, as example, the squeeze effect generated by the pressure between the components of the tribological pair. Dimples placement improves the impact absorption at a maximum load point, accruing in or next to the top dead center, caused by the combustion in the combustion chamber within the cylinder of the engine. The special design of dimples reduces the risk of cavitation, providing an improved worked condition to the tribological pair. The profiled regions ensure to the tribological pair an optimum operation, providing a better adaption to the piston pin elastic deformation. This leads to a minimized strain accumulation and pronounced wear caused by the pin deflection under operation, which generates unfailingly, failure and debris.

The aforementioned features as well as the claimed features and the features to be used in accordance with the invention in the described embodiments are not subject to any special exceptions with respect to their size, shape, material selection and technical concept such that the selection criteria known in the pertinent field can be applied without limitations.

BRIEF DESCRIPTION OF THE FIGURES

Additional details, characteristics, and advantages of the present disclosure are disclosed in the claims and the below description of the figures.

FIG. 4 is a plan view of an unwound small end surface with a profiled region and a defined region comprising dimples.

FIG. 5 is a top view of an example special pattern of dimples within the surface of the small end passage.

FIG. 6 is a detail view of several example dimples.

FIG. 7a is a top view of an example profiled region having a trumpet shape.

FIG. 7b is a top view of an example profiled region having a single-chamfer shape.

FIG. 7c is a top view of an example profiled region with a multiple-chamfer shape.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Figure 1:
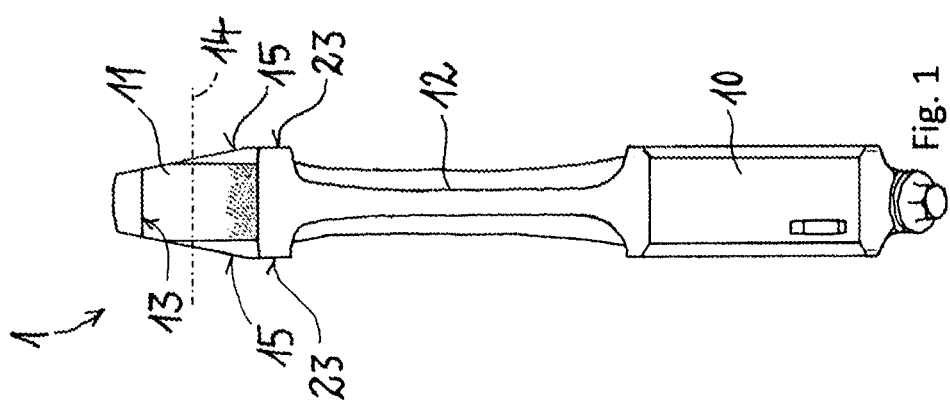
FIG. 1 is a cross-sectional side view of an example connecting rod.

FIG. 1 shows a connecting rod 1 for an internal combustion engine having a big end passage 10, which is performed to receive a pin journal of a crank shaft of the engine, and the connecting rod 1 comprises a small end passage 11, which is performed for receiving a piston pin of a piston, and between the big end passage 10 and the small end passage 11 a shaft 12 is arranged, and the shaft 12 forms a connection between the big end passage 10 and the small end passage 11. The connecting rod 1 according to the invention is designed in a single-piece construction, excluding a big end comprising two pieces, e.g. comprising a stem and cap arrangement.

The small end passage 11 features an inner passage surface 13, which transits into the side walls 23 of the small end with opening edges 15. Accordingly, the length of the small end passage 11 is defined by the length of the passage 11 along the passage axis 14 from side wall 23 to side wall 23, and from opening edge 15 to opening edge 15, respectively.

Figure 2:
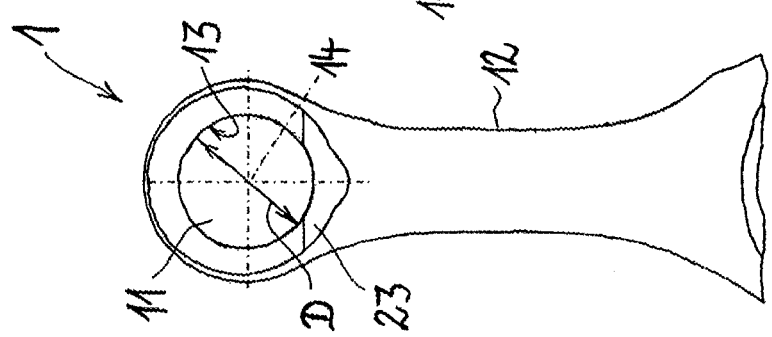
FIG. 2 is a lateral view of a small end and a shaft of the example connecting rod of FIG. 1.

FIG. 2 shows the connecting rod 1 in a lateral view with the shaft 12 and the small end passage 11 featuring the inner passage surface 13, and the lateral view axis lies in the passage axis 14. Accordingly, one of the side walls 23 is shown and surrounds the small end passage 11. The diameter D defines the passage diameter for receiving a piston pin.

Figure 3:
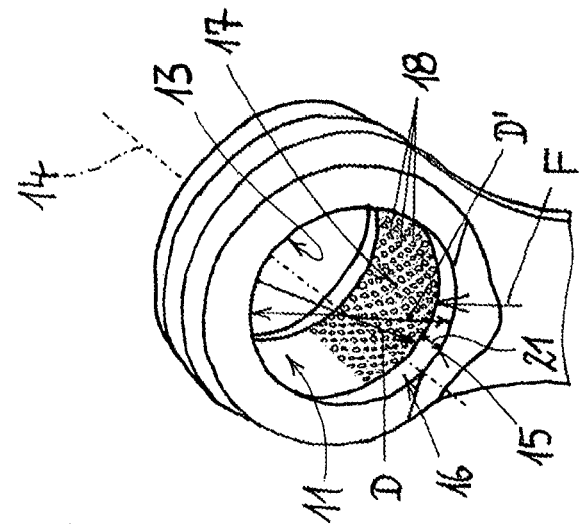
FIG. 3 is a perspective view of the small end of the connecting rod of FIG. 1 with a surface in a small end passage.

FIG. 3 shows a perspective view of the small end of the connecting rod 1 with the small end passage 11 extending along the passage axis 14. The depiction shows the inner passage surface 13 with profiled regions 16 adjacent to the opening edge 15 and with a defined region 17 in which dimples 18 are arranged. The defined region 17 comprising dimples 18 and the profiled region 16 adjacent to the front opening edge 15 are separated from each other, and the region 17 is neighboring the region 16.

The profiled regions 16 each form a crescent shape around the passage axis 14, and in the depiction is pointed out a force center F, which identifies a maximum load of the small end of the connecting rod 1 in an exemplary fashion. In the circumferential region of the force center F the defined region 17 comprising dimples 18 is located, and the crescent shape of the profiled regions 16 form a maximum width 21. In this profiled regions 16 the diameter D of the passage 11 is minimal increased and is shown with the diameter D'.

When the connecting rod 1 is applied in an internal combustion engine, and the piston pin deviates from a cylindrical shape due to combustion forces, the direction and the amount of the piston pin deviation corresponds to the position and the shape of the crescent shape forming the profiled regions 16. The maximum deviation conforms to the force center F and thus conforms to the maximum crescent width 21. Moreover, the density of dimples 18 within the defined region 17 features a maximum in the force center F.

FIG. 4 shows another embodiment of the small end passage, and the inner passage surface 13 is shown in an unwind manner. In the surface 13 the defined region 17 with dimples 18 is shown in between the profiled regions 16, which are located adjacent to each of the opposing opening edges 15.

FIG. 5 shows another embodiment of the inner passage surface 13 with a plurality of dimples 18, which are oriented in single rows 24 under an angle β relative to the passage axis 14. This leads to a special pattern of dimples 18 for improving the lubrication of the cylindrical section in the small end passage 11.

In FIG. 6 different shapes of dimples 18 are shown, and the orientation of the dimple shape is defined by the orientation of the rows 24. Three different shapes of dimples 18 are shown in an exemplary fashion, and the first dimple 18 features a circular shape, the second dimple 18 shows a triangular shape and the third dimple 18 shows an elliptic shape. The triangular shape and the elliptic shape are oriented relative to the row 24 as depicted.

FIG. 7a shows a first embodiment of a profiled region 16 with a trumpet shape 19, which forms the transition between the inner passage surface 13 into the side wall 23 in the opening edge 15.

FIG. 7b shows another embodiment of a profiled region 16 with a single chamfer shape 22, which forms the transition between the inner passage surface 13 into the side wall 23 in the opening edge 15. The chamfer 22 features an angle γ, which can feature—not shown in true scale.

FIG. 7c shows another embodiment of a profiled region 16 with a plurality of chamfers forming a multiple chamfer shape 20 between the inner passage surface 13 and the side wall 23 in the opening edge 15 of the small end passage of a connecting rod. This multiple-chamfer shape 20 leads to a polygon transition in the opening edge 15.

The present invention is not limited by the embodiment described above, which is represented as an example only and can be modified in various ways within the scope of protection defined by the appending patent claims.

LIST OF NUMERALS 1 connecting rod
10 big end passage
11 small end passage
12 beam
13 inner passage surface
14 passage axis
15 opening edge
16 profiled region
17 defined region
18 dimple
19 trumpet shape
20 multiple—chamfer shape
21 width
22 chamfer
23 side wall
24 row
F force centre
D diameter before chamfer
D' diameter at chamfer edge
α circumferential angle
β angle of dimples distribution
γ angle of chamfer
d diameter
h depth
v volume

What is claimed is:

1. A connecting rod for an internal combustion engine, the connecting rod comprising:
   a big end passage configured to receive a pin journal of a crankshaft;
   a small end passage configured to receive a piston pin, the small end passage extending along a passage axis and delimited by opposed edges, wherein the small end passage comprises an inner passage surface with a cylindrical surface portion that has a first diameter and a plurality of dimples, wherein the inner passage surface comprises profiled regions that are adjacent to the opposed edges and extend at least over a part of a circumference of the opposed edges, with the profiled regions beginning at the cylindrical surface portion and increasing to a maximum second diameter at the opposed edges, and wherein the profiled regions are free of dimples; and
   a beam disposed between the big end passage and the small end passage.

2. The connecting rod of claim 1 wherein the profiled regions are configured in a shape of a trumpet or in a shape of a multiple-chamfer.

3. The connecting rod of claim 1 wherein the profiled regions comprise a single chamfer, wherein an angle between a surface of the chamfer and the passage axis is between 1 arcminute and 1 degree.

4. The connecting rod of claim 1 wherein the profiled regions comprise a single chamfer, wherein an angle between a surface of the chamfer and the passage axis is between 5 to 25 arcminutes.

5. The connecting rod of claim 1 wherein the profiled regions have a width as measured along the passage axis in a range of 4 mm to 15 mm.

6. The connecting rod of claim 1 wherein the profiled regions form a crescent shape through the passage axis over a circumferential angle through which the profiled regions extend along the part of the circumference of the opposed edges.

7. The connecting rod of claim 6 wherein the profiled regions are positioned in or next to a section of the small end passage where the beam transitions into the small end passage.

8. The connecting rod of claim 1 wherein the plurality of dimples have a diameter of 50 μm to 110 μm.

9. The connecting rod of claim 1 wherein the plurality of dimples have a depth of 5 μm to 6 μm.

10. The connecting rod of claim 1 wherein the plurality of dimples is disposed in a defined region of the inner passage surface, wherein the plurality of dimples occupies a cumulated surface area of 4% to 11% of the defined region.

11. The connecting rod of claim 1 wherein the plurality of dimples is disposed in a defined region of the inner passage surface, wherein the defined region is positioned between the profiled regions.

12. The connecting rod of claim 1 wherein the plurality of dimples is disposed in a defined region of the inner passage surface, wherein the defined region is positioned adjacent to at least one of the profiled regions within the small end passage.

13. The connecting rod of claim 1 wherein the density of the dimples is greatest at a force center of the small end.

14. The connecting rod of claim 1 wherein the profiled regions each form a crescent shape with a maximum crescent width located at a force center of the small end.

* * * * *